(12) United States Patent
Chari et al.

(10) Patent No.: US 7,729,278 B2
(45) Date of Patent: Jun. 1, 2010

(54) WIRELESS ROUTING BASED ON DATA PACKET CLASSIFICATIONS

(75) Inventors: Amalavoyal Chari, Sunnyvale, CA (US); Mukesh Gupta, Milpitas, CA (US); Ramanagopal Vogety, Milpitas, CA (US); Wenge Ren, Sunnyvale, CA (US)

(73) Assignee: Tropos Networks, Inc., Sunnyvale, CA (US)

( * ) Notice: Subject to any disclaimer, the term of this patent is extended or adjusted under 35 U.S.C. 154(b) by 367 days.

(21) Appl. No.: 11/805,999

(22) Filed: May 25, 2007

(65) Prior Publication Data

US 2008/0192692 A1 Aug. 14, 2008

Related U.S. Application Data

(60) Provisional application No. 60/901,162, filed on Feb. 14, 2007.

(51) Int. Cl.
*H04J 1/16* (2006.01)
*H04L 12/56* (2006.01)

(52) U.S. Cl. ............... 370/252; 370/401; 370/419
(58) Field of Classification Search ............ 370/252, 370/352–356, 400, 401, 419
See application file for complete search history.

(56) References Cited

U.S. PATENT DOCUMENTS

| | | |
|---|---|---|
| 4,939,726 A | 7/1990 | Flammer et al. |
| 5,129,096 A | 7/1992 | Burns |
| 5,295,154 A | 3/1994 | Meier et al. |
| 5,400,338 A | 3/1995 | Flammer, III |
| 5,455,569 A | 10/1995 | Sherman et al. |
| 5,479,400 A | 12/1995 | Flammer, III et al. |
| 5,563,881 A | 10/1996 | Perelman et al. |
| 5,610,839 A | 3/1997 | Karokak et al. |
| 5,740,366 A | 4/1998 | Mahany et al. |
| 5,974,236 A | 10/1999 | Sherman |
| 5,987,011 A | 11/1999 | Toh |
| 6,044,062 A | 3/2000 | Brownrigg et al. |
| 6,046,992 A | 4/2000 | Meier et al. |
| 6,249,516 B1 | 6/2001 | Brownrigg et al. |
| 6,298,053 B1 | 10/2001 | Flammer, III et al. |
| 6,349,091 B1 | 2/2002 | Li |
| 6,349,210 B1 | 2/2002 | Li |
| 6,385,174 B1 | 5/2002 | Li |
| 6,437,692 B1 | 8/2002 | Petite et al. |
| 6,704,301 B2 | 3/2004 | Chari et al. |
| 6,728,514 B2 | 4/2004 | Bandeira et al. |
| 6,804,532 B1 | 10/2004 | Moon et al. |
| 6,829,347 B1 | 12/2004 | Odiaka |
| 6,850,502 B1 | 2/2005 | Kagan et al. |
| 6,885,660 B2 | 4/2005 | Inbar et al. |
| 6,965,575 B2 | 11/2005 | Srikrishna et al. |
| 6,973,039 B2 | 12/2005 | Redi et al. |
| 2004/0192288 A1* | 9/2004 | Vishwanath ............ 455/423 |
| 2008/0049776 A1* | 2/2008 | Wiley et al. ............. 370/419 |

\* cited by examiner

*Primary Examiner*—John Pezzlo
(74) *Attorney, Agent, or Firm*—Brian R. Short

(57) ABSTRACT

A method of wirelessly routing based on data packet type is disclosed. The method includes a wireless access node wirelessly receiving a data packet. The wireless access node classifies the data packet, and selects one of multiple node interfaces based on the classification of the data packet, and/or characteristics of the node interfaces. The wireless access node forwards the data packet over the selected node interface.

28 Claims, 8 Drawing Sheets

WIRELESS ROUTING BASED ON DATA PACKET CLASSIFICATIONS

CROSS-REFERENCES TO RELATED APPLICATION(S)

The present application is based on and claim the benefit of U.S. Provisional Patent Application Ser. No. 60/901,162, entitled "Spectrum and Application-Based Routing", filed on Feb. 14, 2007, the disclosure of which is hereby incorporated by reference in entirety for all purposes.

FIELD OF THE DESCRIBED EMBODIMENT

The described embodiments relate generally to wireless communications. More particularly, the described embodiments relate to a method and apparatus for wirelessly routing based on data packet classifications.

BACKGROUND

Wireless mesh networks are gaining popularity because wireless infrastructures are typically easier and less expensive to deploy than wired networks. The wireless mesh networks typically include wired gateways that are wirelessly connected to wireless nodes, or wirelessly connected directly to client devices. Many wireless nodes can collectively provide a wireless mesh, in which client devices can associate with any of the wireless nodes.

Routing paths can be selected between the nodes of the mesh network according to one or more of many possible routing selection procedures. The routing paths provide a path for data flow between a client device associated with the wireless mesh network and a gateway of the mesh network. The gateway can be wire-connected to a wired network which is connected, for example, to the internet. Due to the possibility of changing locations of the wireless nodes, and due to the typically changing link qualities of wireless connections, the best quality routing path available can vary with time. Additionally, wireless clients typically roam from one wireless node to another wireless node.

Wireless networks can be useful for providing communications for emergency services. An advantage of wireless networks is that they can provide network access in places and situations that wired networks cannot. For example, when the World Trade buildings were destroyed, or when hurricane Katrina destroyed large parts of New Orleans, much wired network infrastructure was left un-useable. However, emergency access must not be inhibited or interfered when wireless networks are shared between emergency services and general network access.

It is desirable to have wireless network that can simultaneously support routing of multiple types of data packets.

SUMMARY

An embodiment includes a method of wirelessly routing based on data packet type. The method includes a wireless access node wirelessly receiving a data packet. The wireless access node classifies the data packet, and selects one of multiple node interfaces based on the classification of the data packet, and/or characteristics of the node interfaces. The wireless access node forwards the data packet over the selected node interface.

Another embodiment includes a method of wirelessly routing based on data type. The method includes a wireless access node receiving and classifying a data packet. The wireless access node selects at least one of a plurality of access node wireless interfaces based on the classification of the data packet, and characteristics of the node interfaces. The wireless access node forwards the data packet over the at least one selected access node wireless interface.

Another embodiment of the invention includes a method of using multiple radios of a wireless access node of a wireless network. The method includes selecting a 4.9 GHz radio exclusively for public safety data packets, selecting other radios for other types of data packets, and selecting other radios for public safety data packets depending upon specification by a network operator.

Other aspects and advantages of the described embodiments will become apparent from the following detailed description, taken in conjunction with the accompanying drawings, illustrating by way of example the principles of the described embodiments.

DETAILED DESCRIPTION

The embodiments described include wireless access nodes that have multiple types of interfaces. The interfaces can be selected for use depending upon characteristics of the data packets routing through the wireless access nodes. The interfaces can include fiber, Ethernet, and/or licensed or unlicensed wireless. Client associations and routing path selections through the wireless network can be base at least in part on the availability of the different interfaces of the wireless access nodes. At least one of the interfaces can be dedicated to, for example, public safety information.

Figure 1:
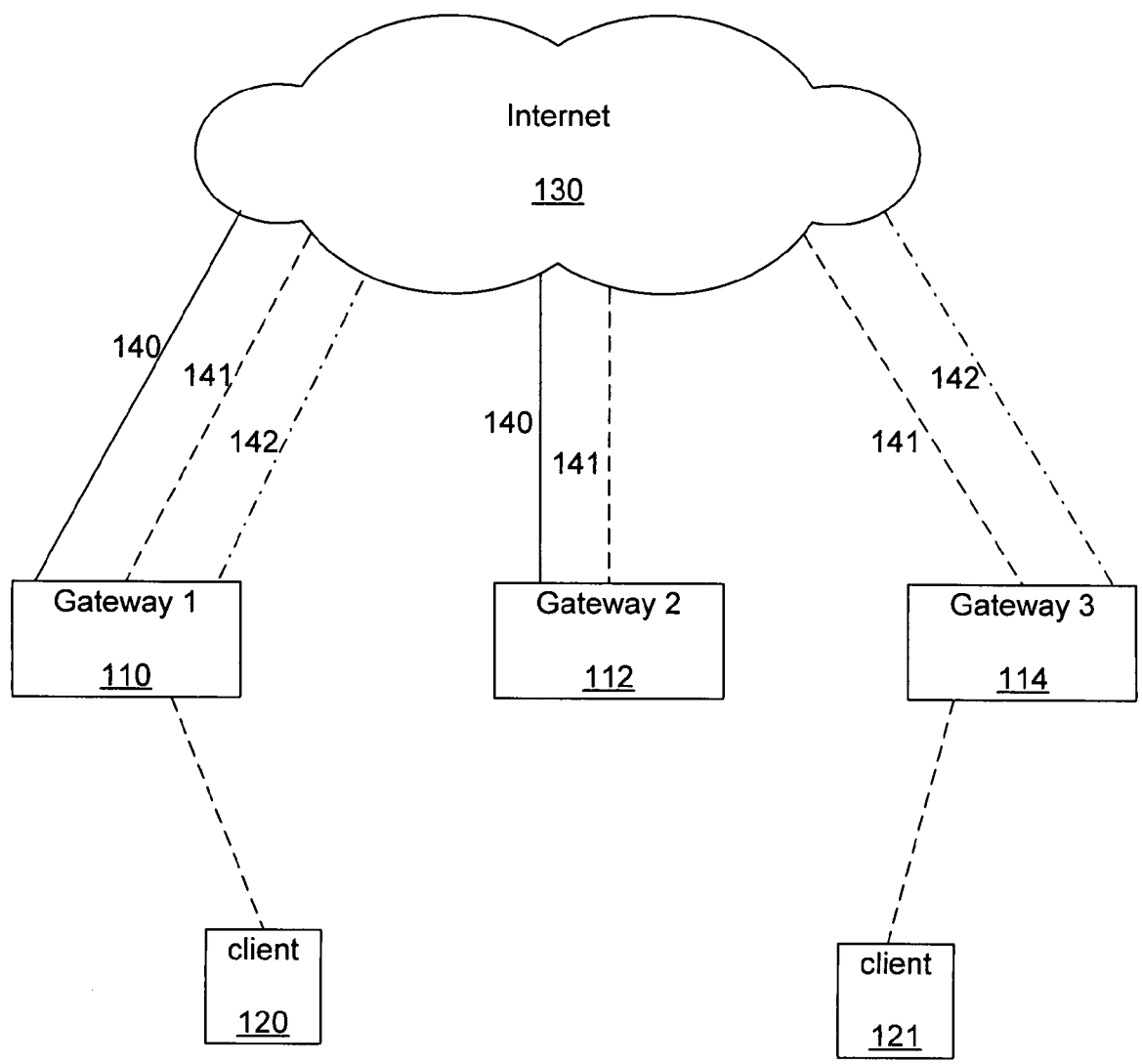
FIG. 1 shows an example of a wireless network that includes nodes having multiple types of node interfaces.

FIG. 1 shows an example of a wireless network that includes multiple wireless access nodes (wireless gateways) 110, 112, 114. Each of the wireless access nodes includes multiple types of node interfaces 140, 141, 142. The wireless access nodes 110, 112, 114 can operate using any number of the node interfaces 140, 141, 142 depending on the data load and/or the data type being routed through the wireless access nodes 110, 112, 114. The node interfaces 140, 141, 142 are connected to an upstream wired network 130, such as, the internet. The wireless access nodes 110, 112, 114 provide client devices 120, 121 with access to the internet 130.

Each of the node interfaces 140, 141, 142 can include a characteristic that makes it unique with respect to the other node interfaces 140, 141, 142. For example, one or more of the node interfaces 140, 141, 142 may be more reliable, have more capacity, or be less expensive than the other node interfaces 140, 141, 142. Some of the node interfaces 140, 141, 142 can operate over licensed or unlicensed wireless spectrum. One of more of the node interfaces 140, 141, 142 can be designated as fall-back node interfaces 140, 141, 142 to be used only when none of the other node interfaces 140, 141, 142 are available. One or more of the node interfaces 140, 141, 142 can be dedicated for public safety.

For an embodiment, the nodes 140, 141, 142 route data base on classifications of the data. For example, data packets that are identified as public safety data can be given the highest priority, and therefore, be routed through a dedicated public safety interface. For example, a 4.9 GHz backhaul interface can be designated as a public safety interface, and all public safety packets can be exclusively routed through it.

Another embodiment includes each of the wireless access nodes advertising the node interfaces of the wireless access node. The advertisements can be received by client devices that may or may not associate with the wireless network. Based on the advertised wireless access node uplink interfaces, the client devices can decide whether to associate with the network, and if associating, which wireless access node to associate with. That is, the client devices can to at least some extent, select with wireless access node to associate with based on the node interfaces being advertised by the wireless access node. As will be described, one method of advertising the node interfaces includes appending node interface information to beacons (for example, routing beacons) that are continually broadcast by the wireless access nodes.

Figure 2:
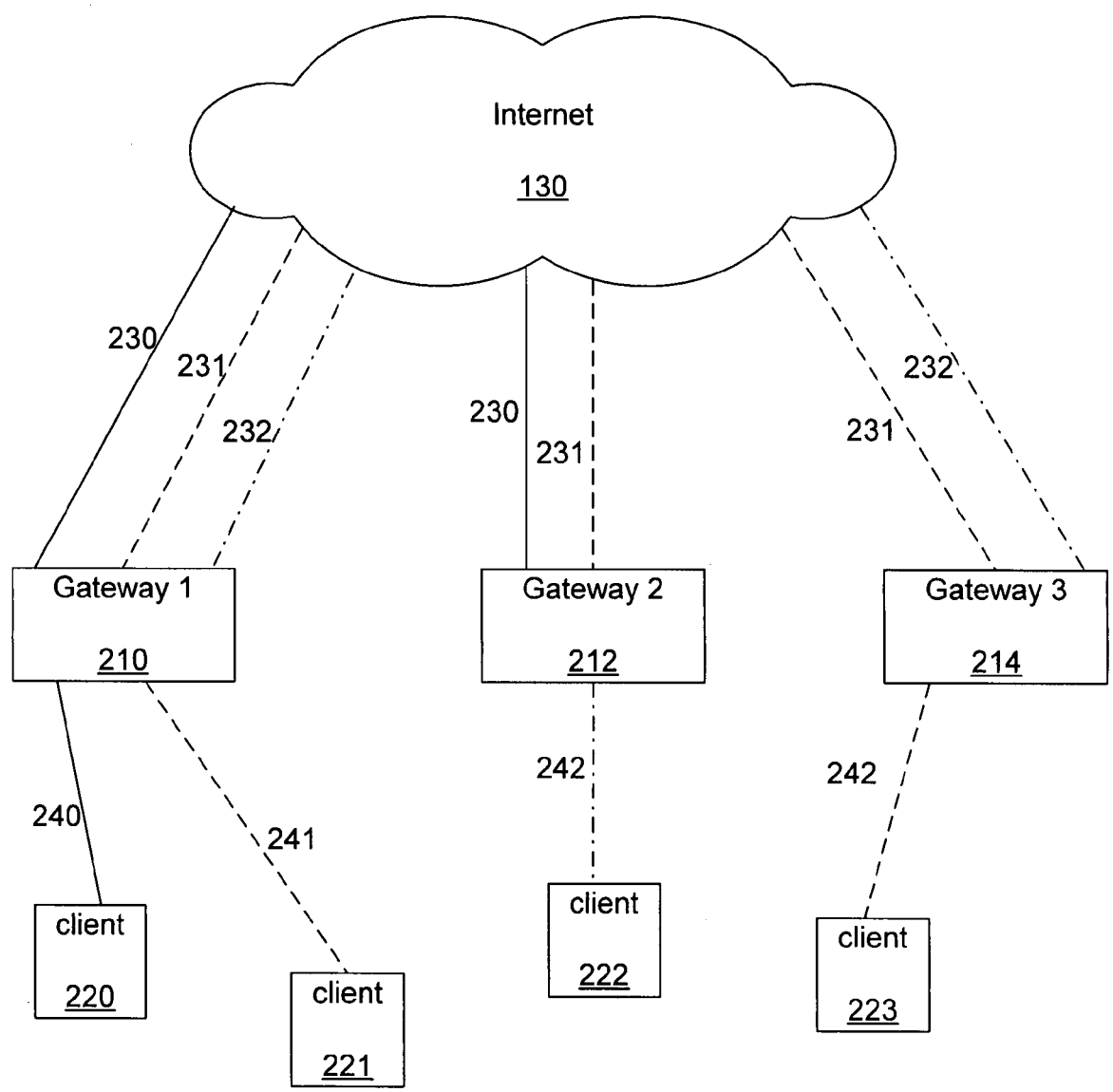
FIG. 2 shows another example of a wireless network that includes nodes having multiple types of uplink and downlink node interfaces.

FIG. 2 shows another example of a wireless network that includes nodes (wireless access point or wireless gateways) having multiple types of node interfaces. Here, the wireless access nodes 210, 212, 214 include multiple upstream interfaces 230, 231, 232 and multiple downstream interfaces 240, 242, 244. Either or both of the upstream interfaces and the downstream interfaces can be selected based upon data packet classifications. That is, the wireless access nodes 210, 212, 214 can base routing of packets through each of the interfaces base on a classification of the data being route. The wireless access nodes 210, 212, 214 provide client devices 220, 221, 222, 223 access to the internet 130.

Each wireless access node can advertise the uplink and downlink node interfaces available. The advertisement can be broadcast on one or more of the available down link node interfaces, allowing client devices to base selection of which wireless access node to associated with based on the advertised node interfaces.

Figure 3:
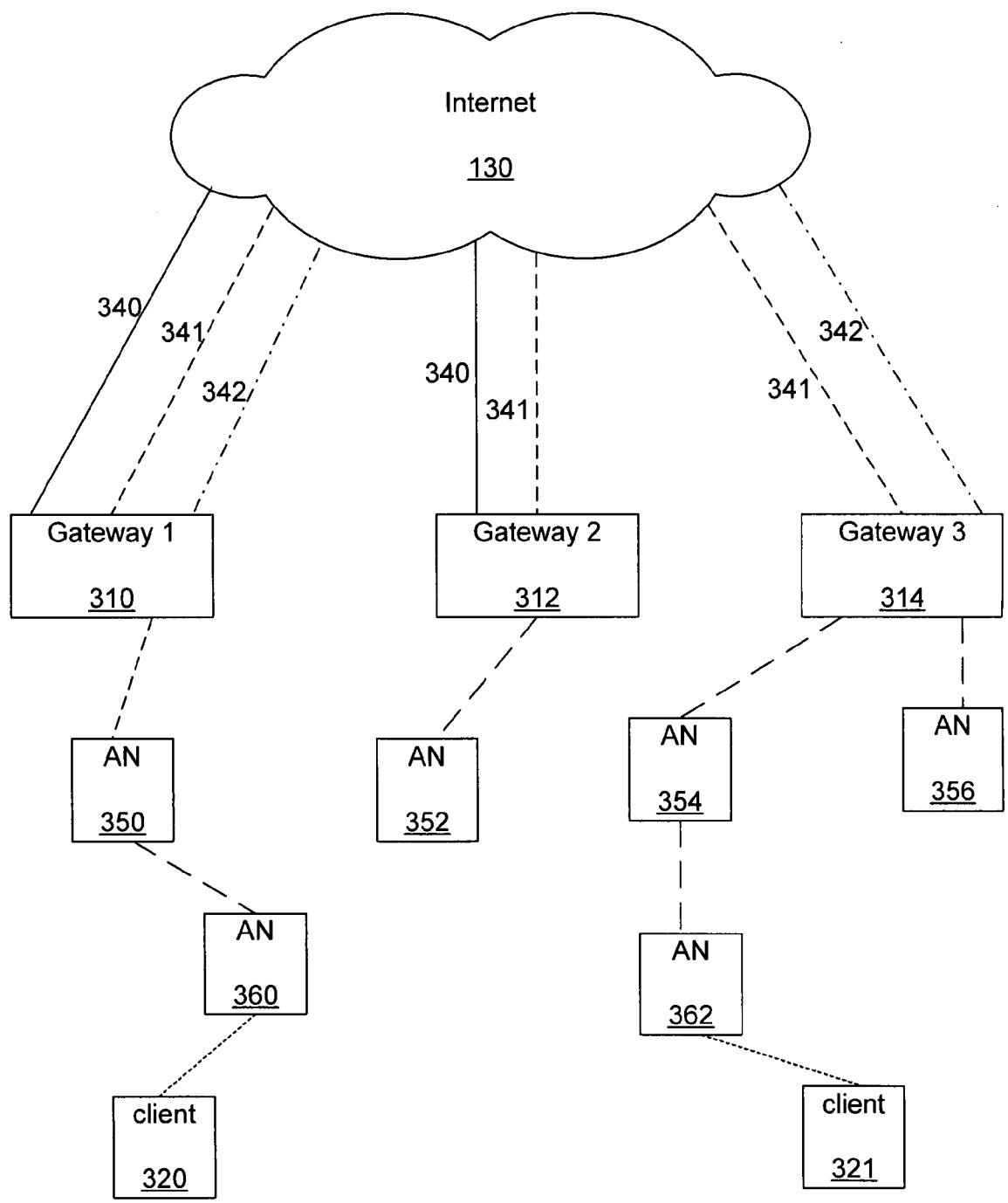
FIG. 3 shows an example of a wireless mesh network that includes wireless access nodes having multiple types of node interfaces.

FIG. 3 shows an example of a wireless mesh network that includes wireless gateways having multiple types of node interfaces. The node interfaces of this embodiment provide multiple uplink or backhaul interfaces 340, 341, 342. As previously described, the gateways 310, 312, 314 can advertise the backhaul interfaces available to each of the gateways 310, 312, 314. Based on the backhaul interfaces, downstream access nodes 350, 352, 354, 356, 360, 362 can select routing paths to at least one of the gateways 310, 312, 314. Client device 320, 321 can associate with any of the access nodes or gateways.

Access Node Routing Selections

Access nodes 350, 352, 354, 356, 360, 362 are coupled either directly or indirectly to the gateways 310, 312, 314. That is, each access node is either directly connected to one of the upstream gateways 310, 312, 314, or indirectly connected through another access node to one of the upstream gateway 310, 312, 314. Many factors node is connected to, including the backhaul interfaces of the gateways 310, 312, 314. The mesh network of FIG. 3 can include any number of additional gateways and access nodes. As shown in FIG. 3, clients 320, 312 can obtain access to the network by establishing a connection to an available access node, such as, any of access nodes 360, 362.

For an exemplary embodiment, the gateways 310, 312, 314 transmit (for example, by broadcast) routing packets (beacons), which can be used to determine routing paths between access nodes 350, 352, 354, 356, 360, 362 and the gateways 310, 312, 314 of the network. The beacons are received by all first-level access nodes (for example, access nodes 350, 352, 354, 356), which are access nodes that are able to receive gateway transmitted beacons, and directly route data through to a gateway.

The beacons originated at the gateways include an identifier of the gateway and interface availability of the gateway. The beacons are used to establish a route from each access node to a gateway. The first level access nodes re-transmit (for example, by re-broadcast) the beacon data, attaching their own information to the beacon. The information indicates to the second level access nodes that an available path to the gateway includes the first level access node. The rebroadcast information can include the addresses of all upstream access nodes along the path to the gateway access node, and the types of interfaces available at each of the upstream access nodes and gateways. That is, an embodiment includes each access node that receives routing beacons, modifying the routing beacons of a selected route by attaching an address of the access node and the interface types of the access node, and re-broadcasting the modified beacons.

For one embodiment, the link quality of the beacon received determines whether that beacon is rebroadcast by the access node. If the quality of the beacon is above a determined threshold, it is rebroadcast. Alternatively, if the quality of the beacon is greater than the quality of all other received beacons, the beacon is rebroadcast. Another embodiment includes each access node only re-broadcasting beacons received from its currently-chosen default gateway (the default gateway is the last selected upstream gateway).

Beacons can be used to determine the quality of the link in both an upstream (towards a gateway) direction, and in a downstream (away from a gateway) direction. Additionally the quality of a link can be influenced by the size of the cluster the link is connected to. The upstream and the downstream direction link qualities, and the cluster size can be used by each access node to select the best data routing path to a gateway. The link qualities can be influenced by other wireless transmission factors such as interference, noise and fading. The link qualities can be determined by calculating the percentage of beacons that are transmitted and successfully received. The link qualities can alternatively or additionally be determined by measuring a PER, BER or SNR of received routing beacons. As described, the link qualities can be influenced by the interfaces available at the device (gateway or access node) that is transmitting the beacon.

Asymmetrical characteristics of the links between access nodes and the gateways can lead to non-optimal routing selections if, for example, the quality of the upstream direction links is not included in routing decisions by access nodes to gateways. Each gateway and access node transmits beacons. All access nodes and gateways that receive the beacons can make an estimate of the quality of the link based upon the reception of the beacons. The estimates can include both upstream direction link quality and downstream direction link quality. Once each access node has the upstream and downstream link qualities within every possible data path to a gateway, the access node can make a selection of the best available data path.

Each access node has at least one upstream node, and may have a plurality of downstream nodes. Upstream nodes are the nodes that are between the access node and the gateway. For a level one access node, there is only one upstream node, the gateway. For a level four access node, there are four upstream nodes, which define the access node's path to the gateway. Downstream nodes are nodes that receive the beacon from a particular access node, and define their path to the gateway through that access node.

FIG. 3 also includes a second level access nodes 360, 362. The second level access nodes select that best quality links to first level access nodes (assuming there are no links to gateways of better quality). Again, the first level access node re-transmit (rebroadcast) successfully received routing packets. The link quality can be determined be calculating the percentage of beacons that are transmitted and successfully received by the second level access nodes. As previously described, the link quality can be additionally influenced by the receive link quality, the availability of the interface indicated within the beacons, and even the hop count of the beacons. The hop count is defined by the number of wireless hops the beacon has traveled, wherein each wireless link counts as a hop. The number of levels of the access nodes of the mesh network is not limited.

The various backhaul interfaces and link interfaces (uplink and downlink) can differ in multiple ways. Similarly the different wired and wireless interfaces on an access node can differ in multiple ways. Some wireless links are more reliable than others. Some backhaul options or wireless links have higher capacity than others. Some backhaul options are more secure than others. Some backhaul options are more inexpensive to use than others. Some backhaul links or wireless links might be preferred for use based on whether they utilize licensed or unlicensed wireless links. Some backhaul options or wireless mesh options can be designated for use only as a fall-back. That is, they are selected when all other options are unavailable. Some interfaces can be designated for use to transport data only from a specific user group or application.

A network operator can additionally specify a set of rules or preferences to guide the utilization of the different wireless frequency bands of different interfaces. For example, the operator may specify that the 4.9 GHz band interface is exclusively for public safety use. The operator can specify that radios operating on the unlicensed 2.4 GHz band can be used to carry residential users' traffic and to carry public safety traffic only if a 4.9 GHz link or path is unavailable. The operator can specify that radios operating on an unlicensed band may be used to carry residential users' traffic and to carry public safety traffic only if a 4.9 GHz link or path is worse in performance than an unlicensed wireless link or path. The operator can specify that public safety traffic has pre-emption rights over other classes of traffic over unlicensed spectrum in the event of an emergency. The operator can specify that public safety traffic has pre-emption rights over other classes of traffic over unlicensed spectrum in the event that a 4.9 GHz link is unavailable or unusable. The operator can specify that a particular band is to be used exclusively to transport traffic that has been identified as video. The operator can specify that a particular application has prioritized access to a particular band. Clearly, these suggested examples of preferences can be used on both backhaul interfaces, and uplink and downlink interfaces of gateways and/or access nodes of a wireless mesh network.

Embodiments of gateways incorporate intelligence about these different characteristics of the different backhaul options on its backhaul interfaces to take the above-listed differences as well as operator-specified rules and preferences into consideration in routing traffic over these backhaul links. Embodiments of access nodes incorporate intelligence about these different characteristics of its different wireless interfaces to take the above-listed differences as well as operator-specified rules and preferences into consideration in routing traffic over these wireless interfaces. The rules can be implemented on a per-packet basis, as part of the routing decision for each packet received by an access node or gateway.

An embodiment of a gateway includes logic to periodically test the performance (throughput, latency and other measures), reliability and availability of the backhaul links on each of its interfaces. An embodiment of an access node includes logic to periodically test the performance (throughput, latency and other measures), reliability and availability of the wireless links on each of its wireless interfaces.

In some applications, a given backhaul interface may only be usable for a specific application or to carry data traffic from a specific user group. For example, there is spectrum available in the 4.9 GHz band exclusively for public safety applications. A backhaul interface with 4.9 GHz wireless backhaul can only be used to transport public safety traffic or traffic identified as originating from or destined to public safety users or networks. As another example, the operator may specify that a specific unlicensed frequency band or channel is to be used exclusively to transport video traffic.

In one embodiment, a gateway can identify traffic as originating from or destined to a public safety user or belonging to a public safety application. In one embodiment, such identification may take place at an access node or gateway based on identifiers in the received data frame such as ESSID, VLAN ID, source/destination IP address range, protocol identifier or some other application identifier. In another embodiment, such identification can take place at an access node where the client device associates and this identification may be conveyed to the gateway through routing messages. For example, a user may associate and authenticate to a public safety ESSID at an access node and get identified as a public safety user. The access node can then convey the IP address, MAC address and other identifiers associated with the user (client device) to the gateway and identify the user as a public safety user. In one embodiment, an access node can identify and classify traffic based on application characteristics and heuristics. For example, voice traffic has certain characteristics (small packets, regularly spaced in time) that might be used to reliably identify a traffic stream as carrying voice, even if no identifiers in a packet or frame identify the application class as voice.

When a gateway receives a data packet that has been identified as coming from or going to a public safety user or as belonging to a public safety application, and that needs to be routed upstream, it may incorporate a preference to route the packet over the preferred (as designated by the operator) backhaul interface.

In some situations, it is possible that a preferred backhaul interface might have a lower throughput than some other backhaul interface and that it is more optimal to route the packet over an alternate backhaul interface. For example, 4.9 GHz wireless propagation outdoors is significantly inferior to 2.4 GHz propagation and it is possible that the performance of a 2.4 GHz unlicensed wireless backhaul link might outperform the performance of the 4.9 GHz backhaul link. In such a case, the gateway may incorporate logic to override the operator-specified preference for 4.9 GHz to instead route the packet over the 2.4 GHz link. It is also possible that the operator-preferred backhaul link is unavailable due to hardware failures or other reasons. In such a case, the gateway may override the operator-specified preference to instead route the packet over an alternate backhaul link.

An embodiment includes a system operator specifying that public safety has pre-emption rights over other traffic classes on unlicensed spectrum in the event of a failure of a 4.9 GHz backhaul link, or an emergency or other event. As another example, the operator may specify that public safety traffic has priority over other traffic classes on unlicensed spectrum in the event of a failure of a 4.9 GHz backhaul link, or an emergency or other event. An event such as failure of a backhaul interface is detectable by the gateway since it can periodically perform tests that evaluate the performance of the links on each of its backhaul interfaces. These tests can include tests of last-hop links as well as end-to-end tests. When a gateway detects failure or under-performance of a 4.9 GHz backhaul link or an operator-specified event, it can mark the link as temporarily unusable or sub-optimal. Any public safety traffic received thereafter, while the 4.9 GHz link is unusable, can be routed over some other backhaul interface, such as unlicensed wireless backhaul. Additionally, it can be prioritized higher than other traffic transiting the backhaul interface. This can be accomplished by placing public safety traffic in a higher priority queue and tagging it with a higher priority tag (such as 802.1p or IETF DSCP) that can be appropriately interpreted by upstream network equipment. Alternatively, it may temporarily stop routing all other traffic over the unlicensed wireless backhaul link, so as to maintain its availability for higher priority public safety traffic. In another embodiment, a management server or network manager may detect an event such as an emergency and send an instruction to a management server to initiate prioritized access or pre-emption rights for public safety traffic over other traffic classes using unlicensed frequency bands.

In some embodiments, it may be desired to incorporate a preference for transporting data over certain backhaul interfaces. For example, for reasons of reliability, it may be desired to preferentially transport traffic over a backhaul interface that consists of a wireless link operating over licensed spectrum. The gateway may incorporate this preference in its routing logic. However, the routing logic may be capable of overriding this preference in the event that the preferred backhaul interface is identified as offering poor performance or lower performance than some other backhaul interface that is available to be used based on the operator-specified rules.

Figure 4:
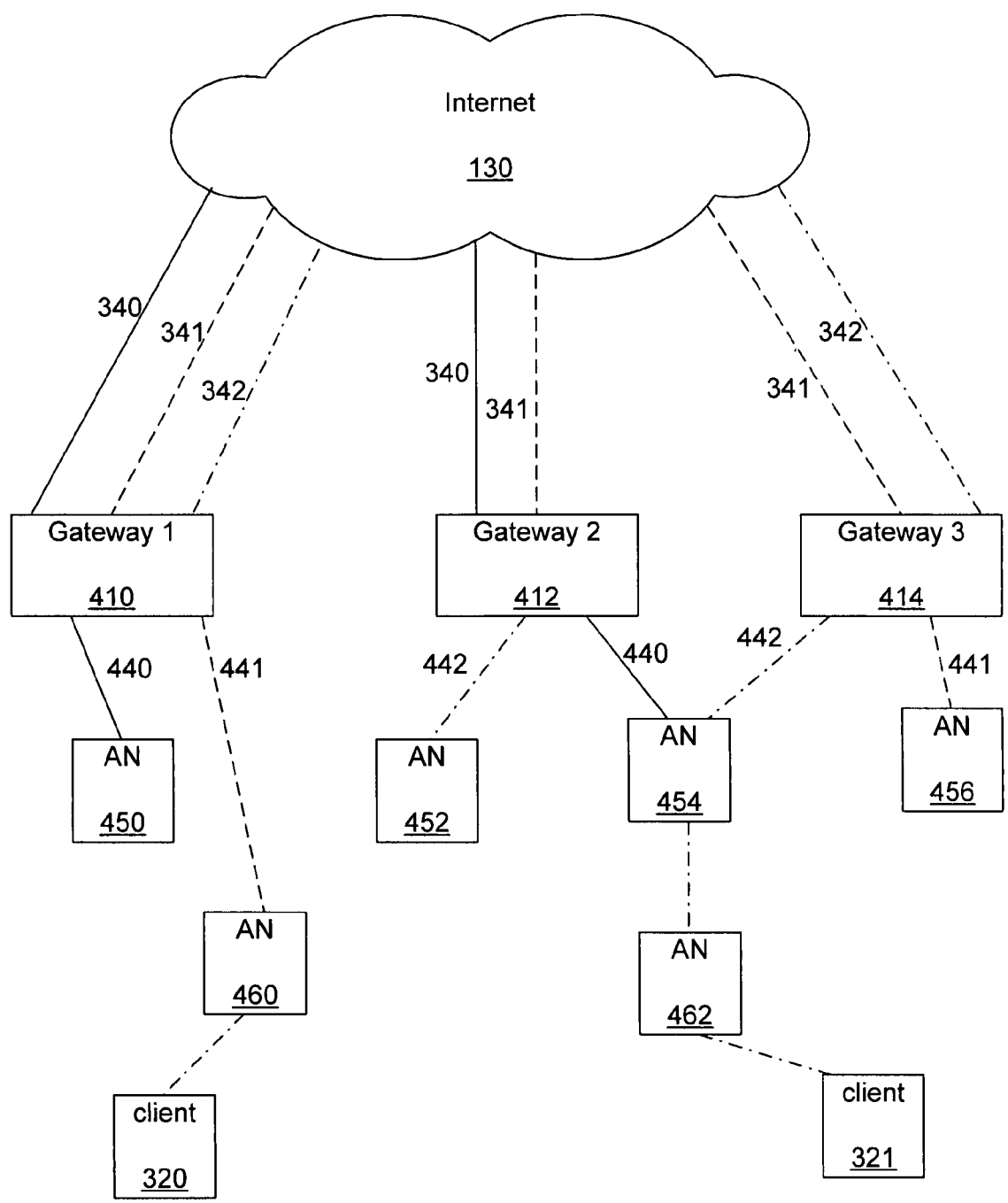
FIG. 4 shows another example of a wireless mesh network that includes wireless access nodes having multiple types of node interfaces.

FIG. 4 shows another example of a wireless mesh network that includes wireless gateways 410, 412, 414 having multiple types of node interfaces. The node interfaces of this embodiment provide multiple backhaul interfaces 340, 341, 342 and/or multiple downlink interfaces 440, 441, 442. Both the backhaul interfaces 340, 341, 342 and the multiple downlink interfaces 440, 441, 442 can be advertised by the gateways so that downstream access nodes can select routing paths base at least in part on the availability of the interfaces. As will be described, one or more of the interfaces can be dedicated exclusively to certain types of network data, such as, public safety.

As previously described, the access nodes 450-462 can select routing paths to upstream gateways. However, the access nodes can include multiple uplink interfaces. For example, access node 454 is shown having uplink interfaces 440, 442. Therefore, based on the availability and quality of the downlink interfaces of the gateways 410, 412, 414, the access nodes can select multiple routing paths to multiple upstream gateways. That is, for example, the access node 454 may select gateway 412 because of its availability of an interface (such as, interface 440, which could be, for example, a 4.9 GHz band interface) that is dedicated to public safety. However, for general data packets, a different interface (such as, interface 442) may provide a higher quality routing path to the upstream gateway 414. Additionally, the interface 440 may not be available for general data packets. That is, the interface 440 may be exclusively dedicated to public safety.

An embodiment of wireless mesh access nodes includes multiple radios operating in multiple frequency bands. The operator-specified rules and preferences may apply to the radios operating in the mesh.

The access nodes select routing paths based on path quality. Paths that are selected as routing paths are those with high path quality. An access node selects an upstream access node as a default route for the purpose of forwarding traffic upstream. In one embodiment, a default route is selected for each radio interface. For example a first node may select a second node as its 4.9 GHz default route, and a third node as its 2.4 GHz default route.

As described, access nodes may transmit routing packets or beacons to advertise the availability of a routing path. In one embodiment, a gateway can transmit routing packets advertising all of its active backhaul interfaces and performance metrics (throughput, latency, capacity, packet loss, etc.) for each backhaul interface. These routing packets may be transmitted on a plurality of frequency bands, depending on the active radio interfaces on the gateway. For example, gateway X may advertise a 4.9 GHz backhaul interface with throughput of 10 Mbps and latency of 20 ms and a 5 GHz backhaul interface with throughput of 18 Mbps and a latency of 15 ms whereas gateway Y may advertise a 4.9 GHz backhaul interface with throughput of 8 Mbps and latency of 40 ms and a 5 GHz backhaul interface with throughput of 24 Mbps and a latency of 10 ms. An access node Z receiving these routing packets may determine that it is preferable to route public safety traffic through gateway X (since gateway X's 4.9 GHz backhaul interface has better performance than gateway Y) and to route all other traffic through gateway Y (since gateway Y's 5 GHz backhaul interface has better performance than gateway X). An access node may also base its routing decisions on the quality of the wireless mesh links to upstream nodes. For example, access node Z may receive routing beacons from gateway X with packet success probability p1 over its 2.4 GHz radio, p2 over its 4.9 GHz radio interface and p3 over its 5 GHz radio interface and receive routing beacons from gateway Y with packet success probability q1 over its 2.4 GHz radio, q2 over its 4.9 GHz radio interface and q3 over its 5 GHz radio interface. If q3>p3 and q2>p2 and p1>q1, the access node may select gateway Y as its 5 GHz default route and 4.9 GHz default route, but select gateway X as its 2.4 GHz default route. In one embodiment, an access node can transmit routing beacons advertising its active routing paths over a plurality of frequency bands. Downstream access node receiving these beacons can make routing decisions to route through this access node or through alternatives. Different routes may exist for different classes of traffic, different applications and across different frequency bands. The routing decisions may further incorporate performance criteria for the different paths as well as operator-specified rules and preferences.

The access nodes can identify and classify data traffic as described previously. Access nodes can also measure the performance of their paths. Based on the classification and on measured performance data for each of the paths in use, an access node that receives a data packet can apply operator-specified rules and preferences to guide its routing decision per-packet. This decision can also incorporate measured performance characteristics of each path. For instance, if an access node's 4.9 GHz path is measured as having low throughput, the access node can decide to route data packets classified as public safety traffic over another interface that has a better throughput, until the 4.9 GHz path improves in performance. The access nodes can implement routing rules such as exclusive or prioritized or pre-emptible use of particular bands for specific applications or user groups and can implement fallback policies in case of certain events or degradations.

In one embodiment, an access node can incorporate a preference for using an unlicensed frequency band to transport data traffic over using a licensed band. Since licensed spectrum is scarce, it may be desirable to reserve the use of that spectrum for communication with clients, while minimizing its use within the mesh. In one embodiment, the access node may switch to using a licensed band to transport data within the mesh if its unlicensed routing paths degrade in quality or performance.

Figure 5:
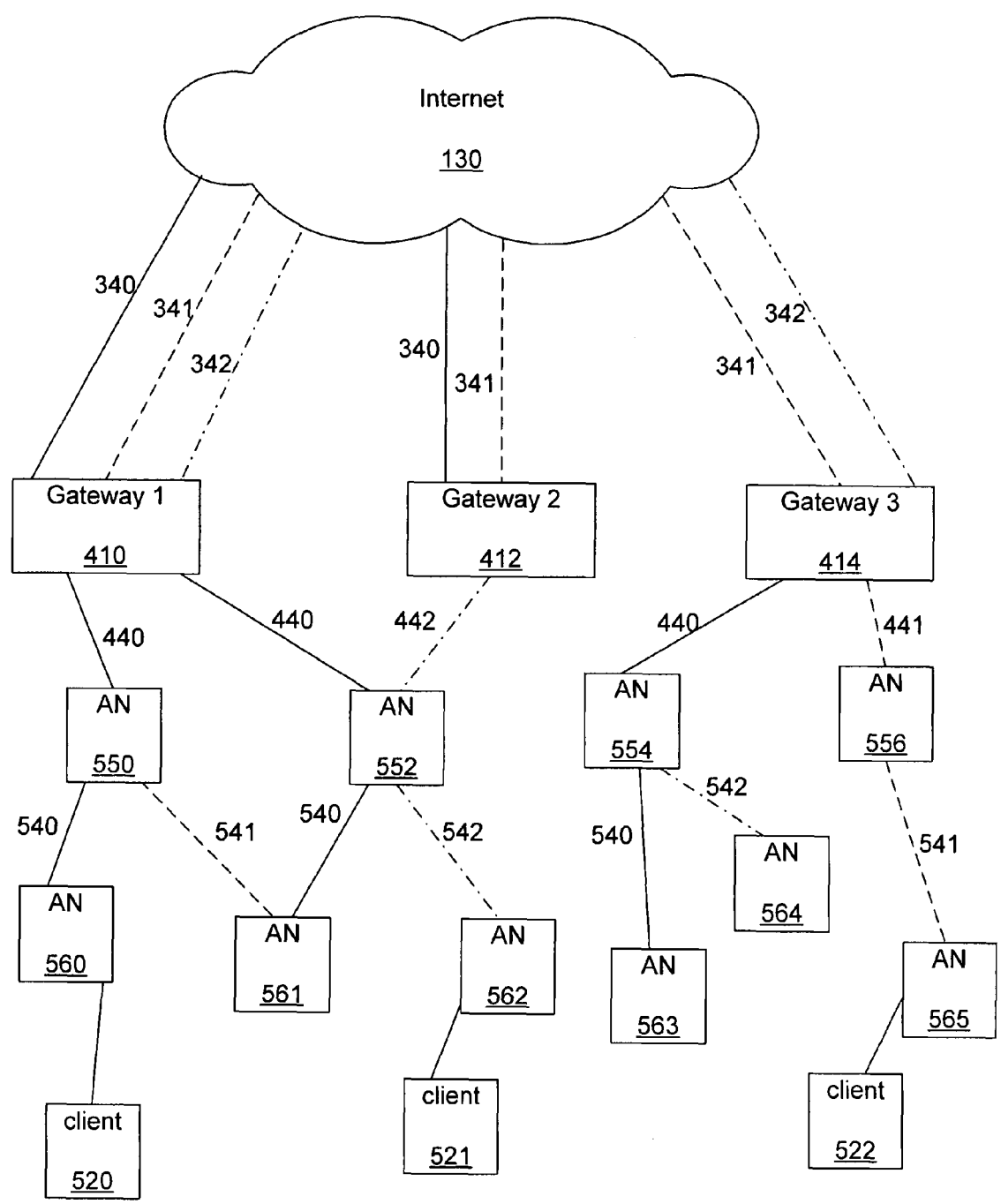
FIG. 5 shows another example of a wireless mesh network that includes wireless access nodes having multiple types of node interfaces.

FIG. 5 shows another example of a wireless mesh network that includes wireless access nodes (gateways and access nodes) having multiple types of node interfaces. For this embodiment, the gateways 410, 412, 414 include multiple backhaul node interfaces 340, 341, 342, multiple downlink interfaces 440, 441, 442, and the access nodes 550, 552, 554, 556 include multiple uplink node interfaces 440, 441, 442 and multiple downlink node interfaces 540, 541, 542. As previously described, the gateways can include information of the available interfaces in broadcast routing beacons. The access node can attached available interfaces in re-broadcast routing beacons.

Multiple Routine Selections

The access nodes 550-565 of the example of a wireless mesh network of FIG. 5 can select routing path using method similar to those previously described. However, the gateways, and the first-order and second-order access node can all have multiple uplink interfaces and multiple downlink interfaces. As previously described, the availability of interfaces can be included within the routing beacons. The availability of multiple interfaces on the uplinks and downlinks enable multiple routing paths to multiple gateways to be selected by the access nodes. That is, any access node can select multiple routing paths to one or more upstream gateways.

As shown in FIG. 5, for example, the second-order access node 561 has multiple possible routing paths to the gateways 410, 412. Potentially two routing path can be selected to a single gateway 410, and additionally or alternatively, a routing path can be selected to the gateway 412. The downstream access nodes can receive routing beacons over multiple interfaces, and therefore, can select different routing paths through different combinations of downlink and uplink interfaces.

Figure 6:
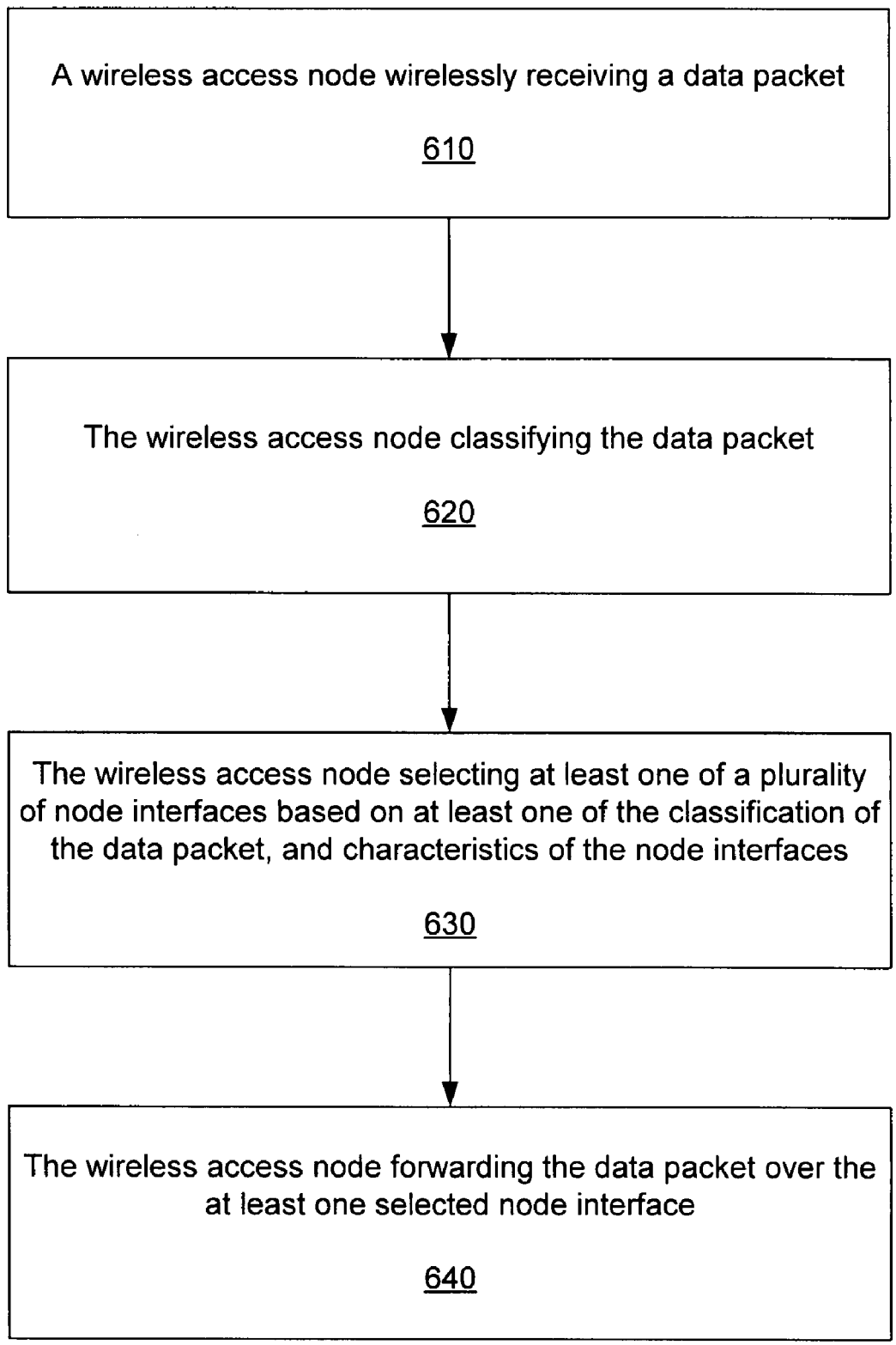
FIG. 6 is a flow chart that includes steps of one example of a method of wirelessly routing based on data packet type.

FIG. 6 is a flow chart that includes steps of one example of a method of wirelessly routing based on data packet type. A first step 610 includes a wireless access node wirelessly receiving a data packet. A second step 620 includes the wireless access node classifying the data packet. A third step 630 includes the wireless access node selecting at least one of a plurality of node interfaces based on at least one of the classification of the data packet, and characteristics of the node interfaces. A fourth step 640 includes the wireless access node forwarding the data packet over the at least one selected node interface.

Generally, selecting at least one of a plurality of node interfaces based on the classification of the data packet includes determining performance characteristics of the node interfaces, and matching the performance characteristics of the node interfaces with the classification of the data packet. A non-exhaustive list of exemplary performance characteristics includes information of whether the interface is alive, a security of the interface, a latency associated with the interface, a capacity of the interface, throughput of the interface, reliability of the interface, cost of the interface, a frequency band of the interface, whether the interface includes a licensed frequency band or an unlicensed frequency band, traffic load of the interface, air-time noise of the interface. Additionally, selecting the access node interfaces based on the classification of the data packet can include receiving preferences specified by a network operator, and matching the node interfaces with the classification of the data packet based on the specified preferences.

For an embodiment, the wireless access node periodically tests performance characteristics of the node interfaces. More specifically, a gateway or access node can include logic to periodically test performance (throughput, latency and other measures) reliability and availability of the backhauls and wireless links on each of its interfaces.

Data classification of the data packets enables the wireless access node to optimally select the best node interfaces for different types of data packets. For example, public safety data packets can be routed through a node interface (such as, a 4.9 GHz wireless link) that is dedicated to public safety information.

As previously described, an embodiment of the wireless mesh network includes gateways that originate routing beacons. The routing beacons can include interface characteristics information in routing beacons originating at the gateways, allowing downstream devices to factor the available node interfaces into routing selection decisions. As previously described, the node interfaces can include either or both upstream links and down stream links of gateways and access node of the wireless mesh network.

Access nodes of the wireless mesh network can select one or more routing paths to one or more gateways based at least in part on backhaul interfaces advertised by upstream gateways. Once a routing path has been selected, one embodiment includes the access nodes rebroadcasts routing beacons successfully received through a selected routing path, wherein the rebroadcast beacons additionally include information of characteristics of node interfaces of the access node. Downstream access nodes can base selection of routing paths through upstream access node based at least in part on the availability of the node interfaces of the upstream access nodes.

A non-exhaustive list of examples of node interfaces includes 2.4 GHz interface, a 5 GHz interface, a WiMAX interface, 3G interface, a 4G interface. A non-exhaustive list of examples of data packet classification includes public safety, a user group, voice traffic, video traffic, 802.16 user data, 802.11 user data, public safety video traffic, public safety voice traffic.

For one embodiment, at least one of the node interfaces is designated as a fall-back interface to be selected only when all other node interfaces are not available. For example, a 2.4 GHz node interface can be selected for public safety data packets only if a 4.9 GHz node interface is not available. Another embodiment includes selecting the 2.4 GHz node interface for public safety data packets only if the 4.9 GHz node interface provides lower quality performance than the 2.4 GHz node interface. Another embodiment includes a preference for selecting an unlicensed frequency node interface over a licensed frequency node interface.

The node interface selection can include a preemptive selection. That is, events (that is, the occurrence of an event) can trigger, for example, public safety data packets to preempt other types of data packets for all available node interfaces. The trigger can be caused by an event, or by a network manager. The preemption can cause public safety data packets to preempt other types of data packets for all available node interfaces if the 4.9 GHz node interface is unavailable.

For an embodiment, the data packets are identified by identifiers within received data frames. For example, a gateway can identify traffic as originating. Examples of possible identifiers includes an src IP address, a destination IP address, an SSID, a VLAN ID, an 802.11e QoS tags, DSCP tags, TCP or UDP port numbers. For one embodiment, the data packets are identified by a node a client is connects to, and the node propagates the identification through routing packets. The node can identify and classify data packets of the client base on application heuristics and characteristics. That is, for example, the node can identify the data as voice or video data by monitoring the characteristics data. That is, the continuous, periodic nature and bandwidth of the data can be used to identify the data as voice or video.

Figure 7:
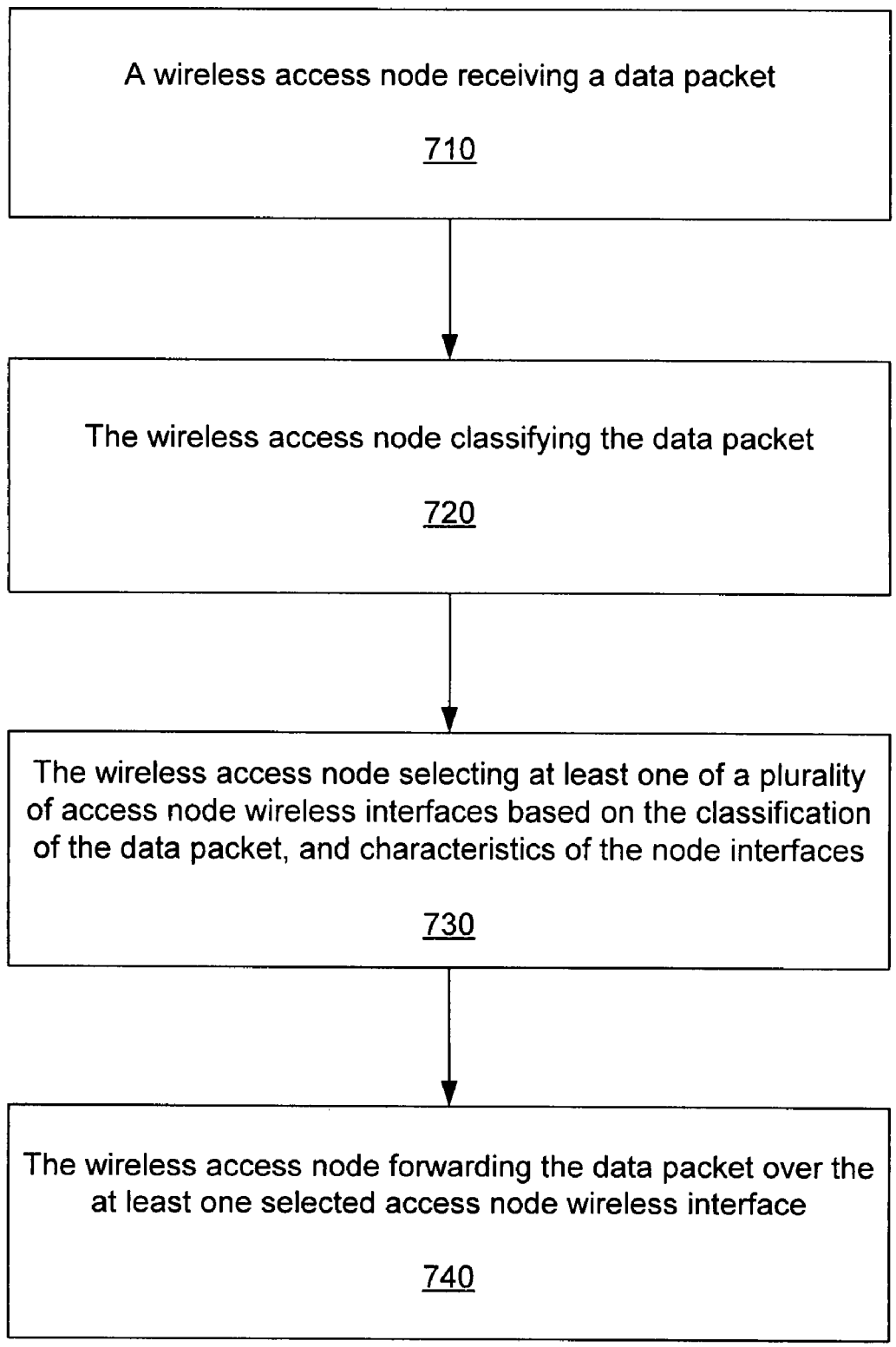
FIG. 7 is a flow chart that includes steps of one example of a method of wirelessly routing based on data packet type.

FIG. 7 is a flow chart that includes steps of one example of a method of wirelessly routing based on data packet type. A first step 710 includes a wireless access node receiving a data packet. A second step 720 includes the wireless access node classifying the data packet. A third step 730 includes the wireless access node selecting at least one of a plurality of access node wireless interfaces based on the classification of the data packet, and characteristics of the node interfaces. A fourth step 740 includes the wireless access node forwarding the data packet over the at least one selected access node wireless interface.

As previously mentioned, an embodiment includes the wireless access nodes selecting an upstream routing path to a gateway based on backhaul interfaces characteristics of the gateway. Also as mentioned, the wireless access node can receive the information of the backhaul interfaces of the gateway from routing beacon originating at the gateway. The access node re-broadcast routing beacons originating at the gateway after attaching information of interface characteristics of the access node.

Figure 8:
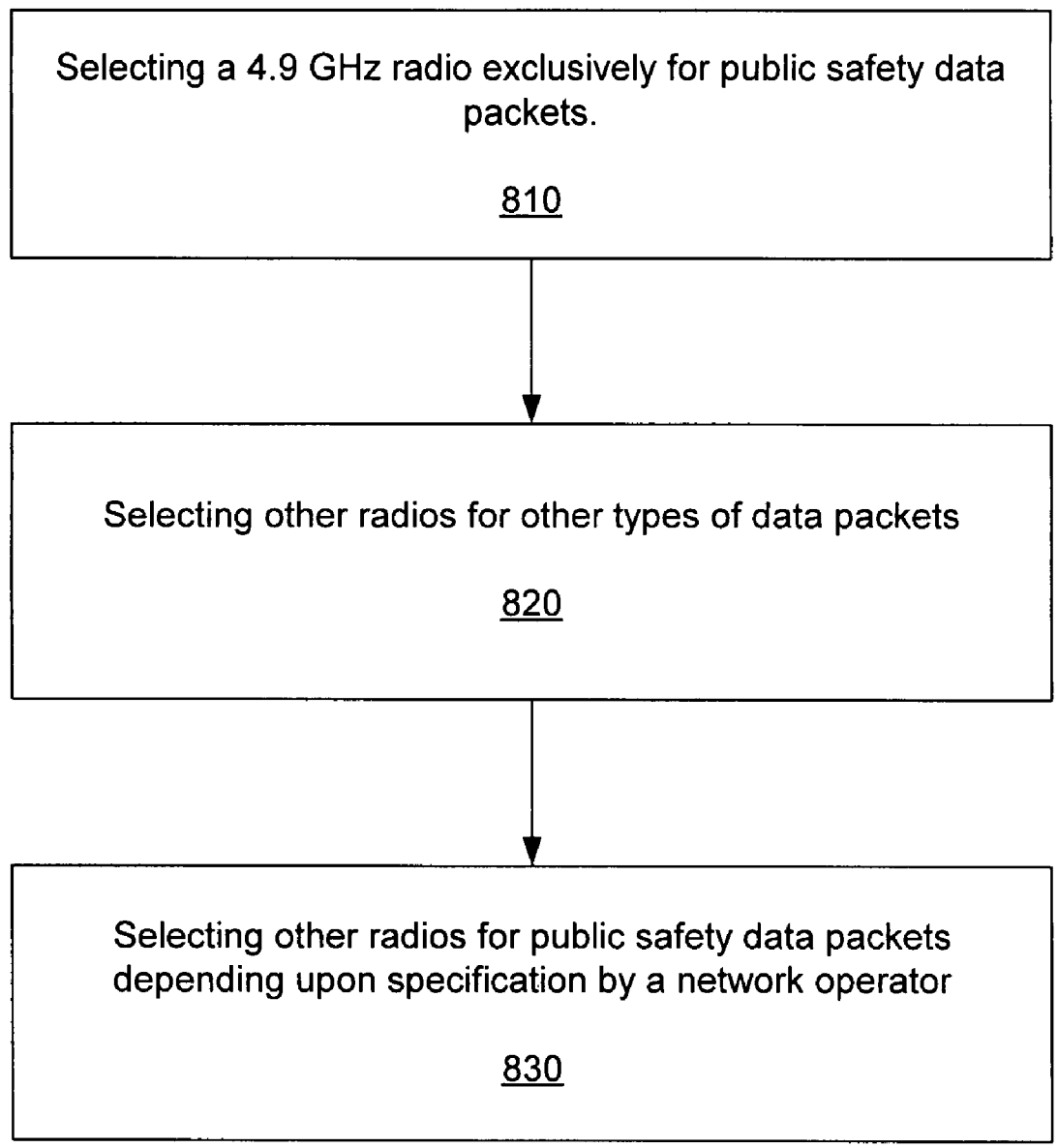
FIG. 8 is a flow chart that includes step of one example of a method of using multiple radios of a wireless access node of a wireless network.

FIG. 8 is a flow chart that includes step of one example of a method of using multiple radios of a wireless access node of a wireless network. A first step 810 includes selecting a 4.9 GHz radio exclusively for public safety data packets. A second step 820 includes selecting other radios for other types of data packets. A third step 830 includes selecting other radios for public safety data packets depending upon specification by a network operator.

For an embodiment, if the 4.9 GHz radio interface is not available, then network operator can specify that the public safety data packets are to use an unlicensed band radio. For another embodiment, if the 4.9 GHz radio provides lower quality performance than an unlicensed band radio, then the network operator can specify that the public safety data packets are to use an unlicensed band radio of the 4.9 GHz radio provide lower quality performance than an unlicensed band radio.

Another embodiment includes providing public safety data packets with preemptive rights to all radios of the wireless access node if triggered by detection an emergency event. That is, if an emergency event is triggered, the communication (for example, public safety information) preempts all other traffic, and is given priority over all other types of data packets. Another embodiment includes providing public safety data packets with preemptive rights to all radios of the wireless access node if the 4.9 GHz radio is unavailable.

Although specific embodiments have been described and illustrated, the embodiments are not to be limited to the specific forms or arrangements of parts so described and illustrated.

What is claimed is:

1. A method of wirelessly routing based on data packet type, comprising:
   a wireless access node wirelessly receiving a data packet;
   the wireless access node classifying the data packet;
   the wireless access node selecting at least one of a plurality of node interfaces based on at least one of the classification of the data packet, and performance characteristics of the node interfaces; and
   the wireless access node forwarding the data packet over the at least one selected node interface;
   wherein the wireless access node periodically tests performance characteristics of the node interfaces.

2. The method of claim 1, wherein selecting at least one of a plurality of node interfaces based on the classification of the data packet comprises:
   determining performance characteristics of the node interfaces; and matching the performance characteristics of the node interfaces with the classification of the data packet.

3. The method of claim 2, wherein the performance characteristics comprise at least one of whether the interface is alive, a security of the interface, latency associated with the interface, a capacity of the interface, throughput of the interface, reliability of the interface, cost of the interface, a frequency band of the interface, whether the interface includes a licensed frequency band or an unlicensed frequency band, traffic load of the interface, air-time noise of the interface.

4. The method of claim 1, wherein selecting at least one of a plurality of access node interfaces based on the classification of the data packet comprises:
   receiving preferences specified by a network operator; and matching the node interfaces with the classification of the data packet based on the specified preferences.

5. The method of claim 1, wherein the plurality of node interfaces comprises at least one of a 2.4 GHz interface, a 4.9 GHz interface, a WiMAX interface, 3G interface, a 4G interface.

6. The method of claim 1, wherein the data packet classification comprises classifying packets as at least one of public safety, a user group, voice traffic, video traffic, 802.16 user data, 802.11 user data, public safety video traffic, public safety voice traffic.

7. The method of claim 1, wherein a 2.4 GHz node interface is selected for public safety data packets only if a 4.9 GHz node interface does not meet certain pre-defined performance thresholds.

8. The method of claim 1, wherein a 2.4 GHz node interface is selected for public safety data packets only if a 4.9 GHz node interface provides lower quality performance than the 2.4 GHz node interface.

9. The method of claim 1, wherein the wireless access node incorporates a preference for selecting an unlicensed frequency node interface over a licensed frequency node interface.

10. The method of claim 1, wherein the wireless access node incorporates a preference for selecting a licensed frequency node interface over an unlicensed frequency node interface.

11. The method of claim 1, wherein occurrence of an event causes public safety data packets to preempt other types of data packets for all available node interfaces if the 4.9 GHz node interface is unavailable.

12. The method of claim 1, further comprising the data packets being identified by identifiers within received data frames.

13. The method of claim 1, wherein identifiers comprise at least one of an src IP address, a destination IP address, an SSID, a VLAN ID, an 802.11e QoS tags, DSCP tags, TCP or UDP port numbers.

14. A method of wirelessly routing based on data packet type, comprising:
- a wireless access node wirelessly receiving a data packet;
- the wireless access node classifying the data packet;
- the wireless access node selecting at least one of a plurality of node interfaces based on at least one of the classification of the data packet, and performance characteristics of the node interfaces; and
- the wireless access node forwarding the data packet over the at least one selected node interface;
- wherein the wireless access node is a gateway of a wireless mesh network.

15. The method of claim 14, wherein the interfaces are backhaul interfaces of the gateway.

16. The method of claim 14, wherein the interfaces are downstream links of the gateway.

17. The method of claim 14, wherein the gateway includes interface characteristics information in routing beacons originating at the gateway.

18. A method of wirelessly routing based on data packet type, comprising:
- a wireless access node wirelessly receiving a data packet;
- the wireless access node classifying the data packet;
- the wireless access node selecting at least one of a plurality of node interfaces based on at least one of the classification of the data packet, and performance characteristics of the node interfaces; and
- the wireless access node forwarding the data packet over the at least one selected node interface;
- wherein the wireless access node is an access node of a wireless mesh network, and the interfaces are a part of at least one of upstream links and down stream links of the access node.

19. The method of claim 18, wherein the access node selects a routing path to a gateway based at least in part on backhaul interfaces of upstream gateways.

20. The method of claim 19, wherein access nodes additionally select paths based on node interfaces available at upstream access nodes.

21. The method of claim 18, wherein the access node rebroadcasts routing beacons successfully received through a selected routing path, the rebroadcast beacons additionally including information of characteristics of node interfaces of the access node.

22. A method of wirelessly routing based on data packet type, comprising:
- a wireless access node wirelessly receiving a data packet;
- the wireless access node classifying the data packet;
- the wireless access node selecting at least one of a plurality of node interfaces based on at least one of the classification of the data packet, and performance characteristics of the node interfaces; and
- the wireless access node forwarding the data packet over the at least one selected node interface;
- wherein at least one of the node interfaces is designated as a fall-back interface to be selected only when some other node interfaces do not meet certain pre-defined performance thresholds.

23. A method of wirelessly routing based on data packet type, comprising:
- a wireless access node wirelessly receiving a data packet;
- the wireless access node classifying the data packet;
- the wireless access node selecting at least one of a plurality of node interfaces based on at least one of the classification of the data packet, and performance characteristics of the node interfaces; and
- the wireless access node forwarding the data packet over the at least one selected node interface;
- wherein occurrence of an event causes public safety data packets to preempt other types of data packets for all available node interfaces.

24. The method of claim 23, wherein the occurrence of the event is signaled by a network manager.

25. A method of wirelessly routing based on data packet type, comprising:
- a wireless access node wirelessly receiving a data packet;
- the wireless access node classifying the data packet;
- the wireless access node selecting at least one of a plurality of node interfaces based on at least one of the classification of the data packet, and performance characteristics of the node interfaces; and
- the wireless access node forwarding the data packet over the at least one selected node interface;
- the data packets being identified by a node a client is connects to, and the node propagating the identification through routing packets;
- wherein the node identifies and classifies data packets of the client base on application heuristics and characteristics.

26. A method of wirelessly routing based on data type, comprising:
- a wireless access node receiving a data packet;
- the wireless access node classifying the data packet;
- the wireless access node selecting at least one of a plurality of access node wireless interfaces based on the classification of the data packet, and characteristics of the node interfaces;
- the wireless access node forwarding the data packet over the at least one selected access node wireless interface;
- the wireless access node selecting an upstream routing path to a gateway based on backhaul interfaces characteristics of the gateway.

27. The method of claim 26, wherein the wireless access node receives information of the backhaul interfaces of the gateway from routing beacon originating at the gateway.

28. The method of claim 27, further comprising the access node re-broadcasting routing beacons originating at the gateway after attaching information of interface characteristics of the access node.

* * * * *